Patented Feb. 2, 1971

3,560,570
PROCESS FOR PREPARING VINYLSULFONYL-ETHYLAMINO COMPOUNDS

George F. Wright, Toronto, Ontario, Canada, and John Irvin Dale III, Kingsport, Tenn., assignors to Eastman Kodak Company, Rochester, N.Y., a corporation of New Jersey
No Drawing. Filed May 17, 1967, Ser. No. 639,042
Int. Cl. C07c 85/00, 89/00, 99/00
U.S. Cl. 260—577       4 Claims

ABSTRACT OF THE DISCLOSURE

Process for the preparation of vinylsulfonylethylamino compounds and quaternary intermediates employed in such process by the quaternization of a 4-phenylthiomorpholinedioxide and contacting the quaternary intermediate with base.

---

This invention relates to a process for the preparation of vinylsulfonylethyl compounds and, more particularly, to the preparation of N-vinylsulfonylethylaniline compounds.

The vinyl compounds prepared in accordance with the process of the invention, have the general formula $$R-\underset{\underset{R^1}{|}}{N}-CH_2CH_2SO_2CH=CH_2$$

wherein R represents a phenyl radical and $R^1$ represents an alkyl radical. The described vinyl compounds can be obtained by reacting a compound having the formula $$R-\underset{\underset{R^1}{|}}{N}H$$

with divinylsulfone. However, this method suffers from a serious disadvantage in that it produces significant amounts of by-product. The formation of by-product decreases the overall yields and requires costly and time consuming purification of the vinyl product. The formula of the by-product can be characterized by the formula $$R-\underset{\underset{R^1}{|}}{N}-CH_2CH_2SO_2CH_2CH_2-\underset{\underset{R^1}{|}}{N}-R$$

The above-mentioned disadvantages are avoided by the process of the invention which, briefly stated, comprises alkylating the nitrogen atom of a 4-phenylthiomorpholine-1,1-dioxide and contacting the intermediate obtained with base to yield the vinyl compound. The novel process of the invention can be illustrated by the following reactions:

(I) 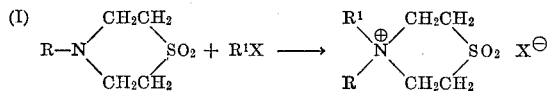

(II) 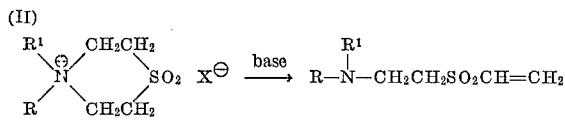

wherein R and $R^1$ are defined above and X represents an anion. The initial reactant i.e. the 4-arylthiomorpholine-1,1-dioxide is prepared according to well known procedures by the reactions of divinylsulfone or one of its precursors, e.g. bis β-chloroethylsulfone, and aniline or a substituted aniline.

The phenyl radical represented by R can be either unsubstituted or substituted. Examples of the substituents which can be present on the phenyl radical represented by R include alkyl, substituted alkyl, alkoxy, substituted alkoxy, alkanoylamino, halogen, hydroxy, alkylsulfonamido, substituted alkylsulfonamido, phenylsulfonamido, substituted phenylsulfonamido, ureido, alkylthio, dicarboximido, etc.

Illustrative of the substituted anilines from which the phenyl radical R is derived are 3-toluidine, 3-chloroaniline, 3-bromoaniline, 3-ethoxyaniline, 3,5-dimethoxyaniline, 2-methoxy - 5 - acetamidoaniline, 2,5-dichloroaniline, 3-methylsulfonamidoaniline, 2-chloro - 5 - p-tolylsulfonamidoaniline, 3-succinimidoaniline, 2-chloro-5-ethylthioaniline, etc.

The alkyl and alkoxy groups which can be present on the phenyl radical can be either substituted or unsubstituted, straight or branched chain alkyl and alkoxy of up to about 18 carbon atoms such as, for example, methyl, ethyl, propyl, isopropyl, butyl, isobutyl, amyl, hexyl, 2-ethylhexyl, octyl, decyl, methoxy, ethoxy, butoxy, hexoxy, etc. Examples of substituted alkyl and alkoxy groups are haloalkyl, e.g. 2-chloroethyl, 2,3-dichloropropyl; cyanoalkyl, e.g. 2-cyanoethyl; nitroalkyl, e.g. 3-cyanopropyl; alkoxyalkyl, e.g. 2-methoxyethyl, 3-ethoxypropyl; arylalkyl, e.g. benzyl; cyanoalkoxy, e.g. 2-cyanoethoxy; haloalkoxy, e.g. 3-bromopropoxy; arylalkoxy, e.g. benzyloxy, etc.

Chlorine and bromine are illustrative of the halogen atoms which can be present on the phenyl radical represented by R. The alkanoylamino groups which can be present on the radical R can have up to 12 carbon atoms. Examples of such alkanoylamino groups are acetamido, propionamido, butyramido, etc. Typical alkylsulfonamido that can be present on the radical R are those containing up to about 12 carbon atoms such as, for example, methylsulfonamido, ethylsulfonamido, 2-cyanoethylsulfonamido, propylsulfonamido, butylsulfonamido, hexylsulfonamido, etc. Examples of the phenyl- and substituted phenylsulfonamido groups are benzenesulfonamido, p-tolylsulfonamido, p-chlorosulfonamido, o,p-dichlorobenzenesulfonamido, m-nitrsulfonamido, etc. The alkylthio groups that can be present on the radical R can have up to about 12 carbon atoms such as, for example, methylthio, ethylthio, propylthio, isopropylthio, butylthio, isobutylthio, amylthio, hexylthio, octylthio, etc. Examples of the dicarboximido groups include succinimido, phthalimido, maleimido, glutarimido, etc.

A preferred group of phenyl radicals represented by R have the formula

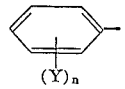

wherein Y represents hydrogen, lower alkyl, lower alkoxy, halogen, or lower alkanoylamino, and $n$ represents 1 or 2. When $n$ is 2, the groups represented by Y can be the same or different.

Particularly preferred phenyl radicals represented by R have the formula

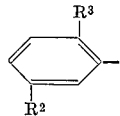

wherein $R^2$ represents hydrogen, lower alkyl, lower alkoxy, halogen, or lower alkanoylamino and $R^3$ represents hydrogen, lower alkyl, lower alkoxy, or halogen. As used herein to describe a carbon containing group, the word lower refers to an alkyl moiety having up to about six carbon atoms.

The alkyl radical represented by $R^1$ can be substituted or unsubstituted, straight or branched chain alkyl of up to about 6 carbon atoms. Examples of the unsubstituted alkyl radicals include methyl, ethyl, propyl, isopropyl, butyl, isobutyl, amyl, hexyl, etc. Examples of the substituted alkyl radicals are hydroxyalkyl, e.g. 2-hydroxyethyl, polyhydroxyalkyl, e.g. 2,3-dihydroxypropyl, alkoxyalkyl, e.g. 2-methoxyethyl, cyanoalkyl, e.g. 2-cyanoethyl, cyanoalkoxyalkyl, e.g. 2-(2-cyanoethoxy)ethyl, alkanoyloxyalkyl, e.g. 2-acetoxyethyl, alkoxycarbonylalkyl, e.g. 2-ethoxycarbonylethyl, alkanoylaminoalkyl, e.g. 2-acetamidoethyl; haloalkyl, e.g. 2-chloroethyl, 3-chloropropyl, 2-bromoethyl, hydroxyhaloalkyl, e.g. 2-hydroxy - 3 - chloropropyl, alkylsulfonylalkyl, e.g. 2 - methylsulfonylethyl, alkyl—OCOOCH$_2$CH$_2$— e.g. CH$_3$OCOOCH$_2$CH$_2$—, carbamoylalkyl, e.g. β-carbamoylethyl, dicarboxylic acid imidoalkyl, e.g. succinimidoethyl; phenylalkyl, e.g. benzyl, 2-phenylethyl; phenoxyalkyl, e.g. 2-phenoxyethyl; alkylsulfonamidoalkyl, e.g. 2 - methylsulfonamidoethyl; carbamoyl; etc. The alkyl moiety, if any, of the substituents present on the substituted alkyl groups represented by R$^1$ is lower alkyl, e.g. lower alkanoyloxyalkyl.

Preferably, R$^1$ represents unsubstituted alkyl of up to four carbon atoms or benzyl. Particularly preferred alkyl radicals represented by R$^1$ are methyl and ethyl.

As stated above, the first step (alkylation) of the process of the invention comprises contacting a 4-arylthiomorpholine-1,1-dioxide with an alkylating agent having the formula R$^1$X wherein R$^1$ is defined above and X represents a monovalent acid anion, such as halogen, e.g. Cl$^-$, Br$^-$, I$^-$; the monalkyl sulfates e.g. CH$_3$SO$_4^-$,

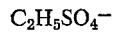

the carbocyclic aryl sulfonates, e.g. C$_6$H$_5$SO$_3^-$,

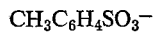

etc. Examples of the alkylating agents, which are well known to those skilled in the art, are dimethyl sulfate, diethyl sulfate, methyl-p-toluene sulfonate, methyl-p-nitrobenzene sulfonate, methyl-2,4-dinitrobenzene sulfonate, ethyl-2,4-dinitrobenzene sulfonate, methyl iodide, benzyl chloride and benzyl bromide, 2-bromoethanol, 2-bromo-1-chloroethane, 2-chlorophenetole, 2-chloroethylacetate, N-2-chloroethylacetamide, benzyliodide, etc.

The alkylation step may be carried out either with or without an inert organic solvent. Examples of inert solvents which can be used include the aliphatic and aromatic hydrocarbons such as hexane, heptane, benzene, toluene, the xylenes, etc.; halogenated aliphatic and aromatic hydrocarbons such as trichloroethane, chlorobenzene, the chlorotoluenes, etc.; alcohols, e.g. isopropanol, 2-methoxyethanol, etc.; cyclic ethers such as dioxane; dimethylformamide; etc.

The alkylation can be carried out over a temperature range of about 70 to 200° C., preferably from about 90 to 110° C. The alkylation step of the process of our invention is most conveniently performed at atmospheric pressure. However, superatmospheric pressures, e.g. up to 1500 p.s.i.g. can advantageously be employed when shorter reaction times and/or lower reaction temperature are desired.

The cationic compounds obtained from the alkylation of a 4-arylthiomorpholine-1,1-dioxide as described above are novel compositions of matter. As will be shown below, the particular anion associated with the cationic compounds of the invention is not important since the anion does not affect the usefulness of the cationic compounds in preparing the compounds having the formula

The mole ratio of the reactants of the alkylation step can be varied over a wide range to obtain the intermediate cations. For example, mole ratios of 4-arylthiomorpholine-1,1-dioxide to alkylating agent of from about 2:1 to about 1:5 are useful in the process. However, for reasons of economy it is preferred that the ratio of 4-arylthiomorpholine-1,1-dioxide is in the range of about 1:1 to about 1:2.5.

The second step of the process of the invention comprises contacting the intermediate cationic compound with base to open the thiomorpholine-1,1-dioxide ring. The hydroxides of the alkalimetals and alkaline earths give satisfactory yields of the end product. Examples of the basic compounds which effect ring opening are potassium hydroxide, sodium hydroxide, lithium hydroxide, calcium hydroxide, magnesium hydroxide, barium hydroxide, etc. Although it is not necessary to do so, an aqueous solution of the intermediate cationic compound can be treated with base after any unreacted thiomorpholinedioxide has been removed. Potassium hydroxide and sodium hydroxide are the preferred bases.

The amount of base that is necessary to effect ring opening is that amount which will render the solution of the intermediate cationic compound basic, e.g. a pH greater than 7. The amount of base necessary to effect ring opening will depend on both the particular alkylating agent and the amount of alkylating agent used in the first step of the process of the invention. The amount of base will also indirectly depend on the reaction conditions employed in the first step which influences the completeness of reaction. Preferably, sufficient base is added to give a pH of about 8–9 to insure maximum conversion of the intermediate to the desired product. Higher pH's, e.g. pH of 10, can of course be used although such operation of the process is not preferred because of economic considerations.

The temperature at which the ring opening step of the novel process can be carried out can be varied widely. Temperatures between about −5 and about 25° yield the desired product. Preferably, the ring opening step is performed at a temperature of from about 0° to about 10° C. While it is most convenient to perform the ring opening step under atmospheric pressure, this step of the process of the invention can be successfully carried out under pressures moderately above or below atmospheric pressure.

The ring opening step of our novel process is carried out in the presence of an inert solvent such as water, dioxane, dimethylformamide, isopropanol, 2 - methoxyethanol, etc. Water is the preferred solvent since both the base and the quaternary intermediate are quite soluble in water while the product is insoluble. A two phase solvent system such as water and toluene can also be used, the intermediate and base being soluble in the aqueous phase and the product being soluble in the organic phase. The product can be recovered from the reaction mixture by conventional techniques.

In carrying out the process of the invention, it is convenient to obtain the quaternary intermediate from the first step of the process in an aqueous solution without isolating the intermediate. This aqueous solution can then be cooled and used in the second step of the process. Alternatively, the quaternary product of the alkylation step can be isolated, for example, by precipitating it as the iodide or zinc chloride double salt followed by filtration. The relatively insoluble iodide salt or zinc chloride double salt of the quaternary intermediate can be stored and, when used in the second step of the process, it can be dissolved in water by the addition of a small amount of an acid, e.g. formic or acetic acid.

The novel process of the invention and the novel intermediate cationic compounds are further illustrated by the following examples.

EXAMPLE 1

N-m-tolyl-thiomorpholine-1,1-dioxide (112.5 g.) and diethylsulfate (80 g.) are heated together on a steam bath for 3 hours. At the end of this time, 300 ml. benzene are added to the resulting gum with stirring. The benzene solution and the residue are then extracted with 1 liter of water in two portions. The organic solution separates and the solvent is evaporated to give unreactedthiomorpholinedioxide. The aqueous solution containing the quaternary salt is extracted a second time with benzene leaving the quaternary salt in the aqueous layer.

EXAMPLE 2

To the aqueous solution of the quaternary salt prepared in Example 1 is added ice and then 43 ml. of 50% solution of sodium hydroxide, the resulting solution having a pH of 8–9. An oil forms which is extracted into benzene and the solvent is evaporated to give 90 g. (71% based on the initial N-m-tolylmorpholine-1,1-dioxide reactant) of N-ethyl-N-β-vinylsulfonylethyl-m-toluidine. Its identity to a product prepared by the action of divinylsulfone on N-ethyl-m-toluidine was shown by its refractive index, infrared spectra, and vapor phase chromatography.

The following examples describe the preparation of additional N-vinylsulfonylethylaniline compounds by employing the described reactants in the above mentioned reactions (I) and (II) according to the general procedure described in Examples 1 and 2.

drowned in water, filtered, washed with water, and air dried. The product has the structure:

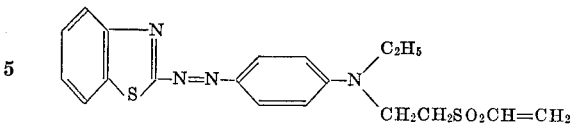

Each of the azo dyes described above give brilliant red dyeings, displaying excellent fasteness properties, on polyester fibers when applied thereto according to the following example.

EXAMPLE 25

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a

| Example No.: | R and amount of 4-arylthiomorpholine-1,1-dioxide, g. | $R^1X$ and amount of alkylating agent, g. | Pressure and temperature during alkylation step, °C. | Temperature and base in ring opening step, °C. |
|---|---|---|---|---|
| 3 | 112.5, m-tolyl | 70, dimethylsulfate | Atmospheric 95 | 0–5, NaOH. |
| 4 | 105.5, phenyl | 80, diethylsulfate | do | 0–5, NaOH. |
| 5 | 105.5, m-tolyl | 70, dimethylsulfate | do | 0–5, KOH. |
| 6 | 22.5, m-tolyl | 13.8, 2-bromoethanol | do | 0–3, NaOH. |
| 7 | 21.1, phenyl | 15.7, 2-bromo-1-chloroethane | do | 0–5, KOH. |
| 8 | 22.5, m-tolyl | 17.2, β-chlorophenetole | do | 8–10, KOH. |
| 9 | do | 13.4, 2-chloroethylacetate | do | 0–5, NaOH. |
| 10 | do | 13.4, N-2-chloroethylacetamide | do | 15–20, KOH. |
| 11 | do | 23.9, benzyliodide | do | 0–5, LiOH. |
| 12 | 24.5, m-Cl-phenyl | 12, dimethylsulfate | do | 0–5, NaOH. |
| 13 | 24.1, m-anisyl | 16, diethylsulfate | do | 0–5, KOH. |
| 14 | 26.8, m-$CH_3CONH$-phenyl | do | do | 0–5, NaOH. |
| 15 | 27.1, 2,5-di-$CH_3O$-phenyl | 17, ethyliodide | 50 p.s.i., 100–110 | 0–5, NaOH. |
| 16 | 29.8, 5-$CH_3CONH$-2-$CH_3O$-phenyl | do | 50 p.s.i., 100–110 | 0–5, NaOH. |
| 17 | 25.5, 2-$CH_3O$-5-$CH_3$-phenyl | do | 50 p.s.i., 100–110 | 3–5, NaOH. |
| 18 | 22.5, m-tolyl | 9, 1-chloro-2-cyanoethane | Atmospheric 95 | 3–5, NaOH. |
| 19 | do | 17.5, 1-chloro-2-succinimidoethane | do | 3–5, NaOH. |
| 20 | do | 12, 1-chloro-2-ethoxycarbonylethane | do | 3–5, NaOH. |
| 21 | 21.1, phenyl | 12, 1-chloro-2-carbamoylethane | do | 3–5, NaOH. |
| 22 | 22.5, m-tolyl | 15.5, 1-chloro-2-methylsulfonylethane | do | 3–5, NaOH. |

The compounds obtained from the process of the invention are useful as couplers in the preparation of textile dyes. The following examples illustrate the preparation of two azo dyes from the couplers and the use of such dyes for dyeing polyester fibers.

EXAMPLE 23

A solution of 2.28 g. of 2-amino-6-methylsulfonylbenzothiazole in 50 g. 50% aqueous sulfuric acid is cooled to 0–5° C. and a solution of 0.72 g. of $NaNO_2$ dissolved in 5 ml. conc. $H_2SO_4$ is added, keeping the temperature less than 0° C. The diazotization reaction is stirred 1.75 hours at 0° C., then added to a solution of 2.53 g. N-ethyl-N-β-vinylsulfonylethyl-m-toluidine dissolved in 100 ml. 15% $H_2SO_4$, all at about 5° C. The coupling is continued at this temperature for 2 hours, then drowned with water, filtered, washed with water, and the dye dried in air.

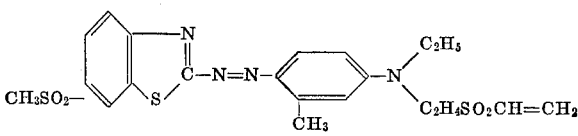

EXAMPLE 24

Sodium nitrite (0.72 g.) is added portionwise to 5 ml. conc. $H_2SO_4$; the solution cooled in an ice bath to about 2° C. and 10 ml. 1:5 acid (1 part propionic: 5 parts acetic) is added below 15° C. Then at below 10° C., 1.75 g. 2-amino-6-cyanobenzothiazole is added, followed by 10 ml. 1:5 acid. The reaction is stirred 2 hours at 0–5° C. and added to a solution of 2.39 g. N-ethyl-N-β-vinylsulfonylethylaniline dissolved in 100 ml. 1:5 acid at 5° C. Solid ammonium acetate is added until the solution turns Congo Red paper brown and the coupling is allowed to stand 2 hours at ice bath temperature. The mixture is then fine emulsion is obtained. Water is then slowly added to a total volume of 200 cc. 3 cc. of Dacronyx (a chlorinated benzene emulsion) are added and 10 grams of a textile fabric made of poly(ethylene terephthalate) fibers are entered. The fabric is worked 10 minutes without heat and then for 10 minutes at 80° C. The dye bath is then brought to the boil and held at the boil for one hour. Following this, the fabric is rinsed in warm water, then scoured in an aqueous 0.2% soap, 0.2% ash solution.

The invention has been described in detail with particular reference to preferred embodiments thereof but it will be understood that variations and modifications can be effected within the spirit and scope of the invention as described hereinabove.

We claim:

1. A process for preparing a compound of the formula

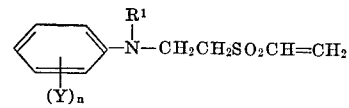

which comprises contacting a quaternary compound having the formula

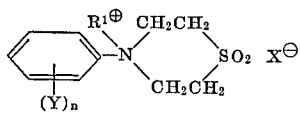

with base to a pH of at least 7 at a temperature of −5 to about 25° C., wherein

Y represents hydrogen, lower alkyl, lower alkoxy, chlorine, bromine, or lower alkanoylamino;

$n$ represents 1 or 2;

$R^1$ represents alkyl of 1 to about 6 carbon atoms or alkyl of about 1 to 6 carbon atoms substituted with hydroxy, lower alkoxy, cyano, lower alkanoyloxy, lower alkoxycarbonyl, lower alkanoylamino, chlorine, bromine, lower alkylsulfonyl, lower alkyl —OCOO—, carbamoyl, succinimido, phenyl, phenoxy, or lower alkylsulfonamido; and X is a monovalent acid anion selected from the group consisting of chloride, bromide, iodide, monoalkylsulfate containing 1 to 6 carbon atoms, phenylsulfonate, tolylsulfonate, or dinitrophenylsulfonate.

2. A process according to claim 1 for preparing a compound having the formula

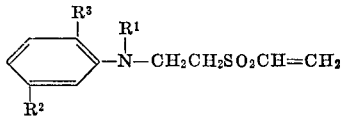

which comprises contacting an aqueous solution of a quaternary compound having the formula

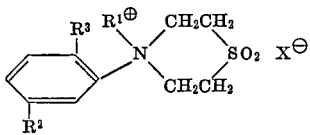

at a temperature of 0 to about 10° C. with sodium hydroxide or potassium hydroxide to a pH of at least 8, wherein $R^1$ represents lower alkyl;

$R^2$ represents hydrogen, lower alkyl, lower alkoxy, chlorine, bromine, or lower alkanoylamino;

$R^3$ represents hydrogen, lower alkyl, lower alkoxy, chlorine, or bromine; and

X represents lower monoalkylsulfate, benzenesulfonate, or p-tolylsulfonate.

3. A process according to claim 2 wherein $R^1$ is methyl; $R^2$ is hydrogen or methyl; $R^3$ represents hydrogen; and X represents methylsulfate.

4. A process according to claim 2 wherein $R^1$ is ethyl; $R^2$ is hydrogen or methyl; $R^3$ represents hydrogen; and X represents ethylsulfate.

References Cited
UNITED STATES PATENTS
2,729,636  1/1956  Erickson _____ 260—243(B)

CHARLES B. PARKER, Primary Examiner

R. L. RAYMOND, Assistant Examiner

U.S. Cl. X.R.

260—243, 326, 463, 465, 470, 481, 553, 556, 558, 562, 573, 574